(No Model.)

N. DU BRUL.
WEIGHING SCALE.

No. 299,760. Patented June 3, 1884.

Attest.
A. P. Knight
Edward Stees

Inventor.
Napoleon DuBrul.
By Knight Bros.
Attys.

UNITED STATES PATENT OFFICE.

NAPOLEON DU BRUL, OF CINCINNATI, OHIO.

WEIGHING-SCALE.

SPECIFICATION forming part of Letters Patent No. 299,760, dated June 3, 1884.

Application filed January 25, 1884. (No model.)

*To all whom it may concern:*

Be it known that I, NAPOLEON DU BRUL, of Cincinnati, in the county of Hamilton and State of Ohio, have invented a new and useful Improvement in Weighing-Scales, of which the following is a specification.

My invention relates to improvements in those balances or weighing-scales in which the torsional elasticity of metal is employed to control the oscillations of the beam.

My improvements have for their object the production, at a moderate expense, of a torsion-balance of great simplicity, sensitiveness, and durability.

In another application, No. 118,691, I have shown, described and claimed, and applied to one form of scale a flat torsion strip, bar, or rod stretched horizontally and set up edgewise, to form a fulcrum strip, bar, or rod for a beam. In other applications, numbered 118,692, 118,693, 118,695, and 118,979, I have shown and described the employment of such strip, bar, or rod with other forms of scales. In the present form of my invention one end of the beam carries the torsion strip, bar, or rod which supports the weighing pan or platform, and its other end carries a slidable weight, and at its extreme end a hanger for one or more supplementary weights.

Figure 1:
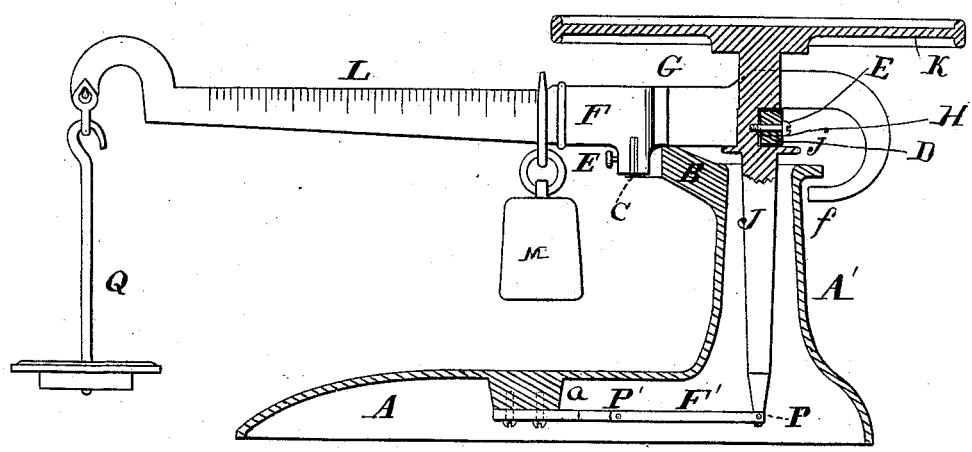
Figure 2:
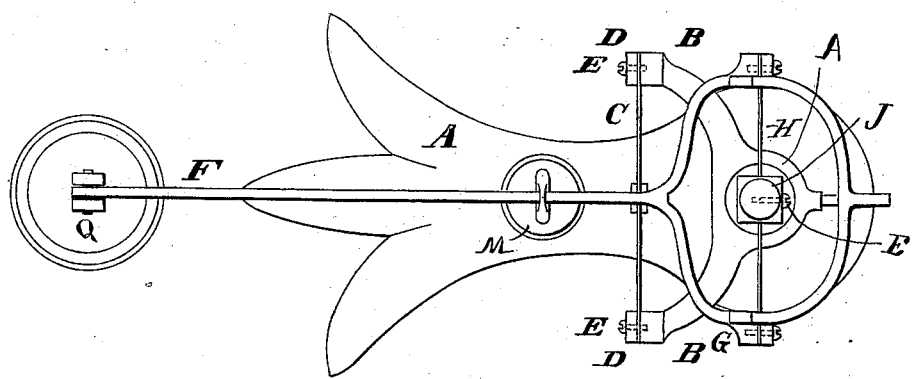
Figure 3:
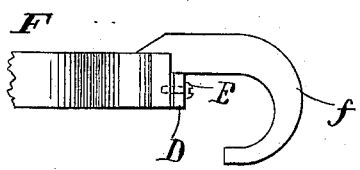

In the accompanying drawings, Figure 1 is a vertical longitudinal section. Fig. 2 is a top view. Fig. 3 is a side view of part of the beam.

A A' is a cast hollow pedestal, consisting, essentially, of a hollow base, A, and a hollow column, A'. From the column project two lugs, B, to each of which is fastened, by a clamping-block, D, and screw E, one end of a flat strip, bar, or rod, C, of steel or equivalent elastic material which has torsional elasticity. The lugs B are the fulcrum-lugs, and the strip, bar, or rod C the fulcrum strip, bar, or rod.

To the fulcrum torsion strip, bar, or rod, at or near its mid-length, there is attached, by similar clamping block and screw to those mentioned, a scale-beam, F, which extends on both sides of the fulcrum-torsion, for the respective support of a weighing pan or platform on one side, and of a slidable weight and suspended hanger for additional weights on the other side, in the manner hereinafter explained. The beam F terminates on the pan side of the scale in a loop, G, to which are properly attached, by clamping blocks and screws similar to those already described, the ends of a torsion strip, bar, or rod, H, similar to the fulcrum torsion strip, bar, or rod.

To the torsion strip, bar, or rod H, at its mid-length, is rigidly attached the vertical stem J of a pan or platform, K. This stem extends downward within the hollow column A', and has its lower extremity secured by pivot P to a link-rod, F', whose other end is secured, by pivot P', to a projection, *a*, from the interior of base A. The portion of beam F on that side of the fulcrum torsion strip, bar, or rod which is remote from the pan is marked with a scale, L, and carries a slidable weight, M. Suspended from the extremity of the same portion of the beam F is a hanger, Q, for the reception of additional weights when desired. The oscillations of the beam are limited to a range such as will not impose unnecessary strain on the fulcrum torsion strip, bar, or rod by collar *j* upon the stem J, and by hook *f* on the beam F, which parts come in contact with the top of the column A', as plainly seen in Fig. 1.

The object of the link-rod F' is to steady and maintain the pan-support in its proper position and prevent the same from touching or rubbing against other parts when the scale oscillates.

By this construction I am enabled to make a very sensitive and durable weighing-scale at a moderate cost with the use of only two torsion-pivots, which may be of any kind of stretched metal possessing the torsional elasticity requisite.

I claim as new and of my invention—

1. In a weighing-scale, the combination of a base, a beam having a weight at one end, fulcrum-support for the beam acting torsionally, torsion strip, bar, or rod secured to the other end of the beam, pan-support rigidly secured to the end torsion strip, bar, or rod, and a single link-rod hinged to the base and stem of the pan-support, as set forth.

2. In a weighing-scale, the combination of the hollow pedestal having lugs B, torsion strip, bar, or rod secured to said lugs, beam having a weight at one end and fastened to the torsion strip, bar, or rod, torsion strip, bar, or rod fastened to the other end of the beam, pan-support rigidly attached to the end torsion strip, bar, or rod, and link-rod pivoted to the base and stem, as set forth.

In testimony of which invention I hereunto set my hand.

NAPOLEON DU BRUL.

Attest:
GEO. H. KNIGHT,
SAML. S. CARPENTER.